United States Patent Office 2,739,961
Patented Mar. 27, 1956

2,739,961

HYDROGENATION PROCESS

John Drew, De Ridder, La., and Joe C. Funderburk, Hattiesburg, Miss., assignors to Hercules Powder Company, Wilmington, Del., a corporation of Delaware No Drawing. Original application March 7, 1951, Serial No. 214,436. Divided and this application November 8, 1952, Serial No. 319,598

12 Claims. (Cl. 260—100)

This invention relates to the hydrogenation of unsaturated compounds and particularly to a new catalyst for hydrogenating rosin and rosin compounds.

It is known that unsaturated compounds can be hydrogenated in the presence of nickel-silicon alloy catalysts. Such catalysts have a high degree of activity and have been used with some success in hydrogenation processes. However, it is also known that such catalysts are seriously deficient in one important characteristic, namely, in physical strength. This shortcoming is particularly noticeable in continuous hydrogenation processes wherein the catalyst is maintained under severe conditions for relatively long periods of time. Under these conditions of high temperature and pressure, nickel-silicon alloy catalysts deteriorate rapidly and finally soften and disintegrate, thereby clogging equipment and effecting smaller yields of hydrogenated product and lessened process efficiency. The art has been in need of a hydrogenation catalyst with the high activity of nickel-silicon alloys but with high physical strength permitting use for extended periods of time under conditions of high temperature and pressure.

Now in accordance with this invention it has been found that an alloy containing from about 45% to about 73% nickel from about 25% to about 50% silicon, and from about 0.5% to about 10% manganese possesses the high catalytic activity of a straight nickel-silicon alloy catalyst and, in addition, possesses great physical strength. The catalyst of this invention is prepared by melting together metallic nickel, metallic silicon, and metallic manganese, or by melting together suitable alloys containing these metals in the proper proportions to give the desired final alloy composition. The catalyst alloy may then be crushed and screened to the desired particle size and the particles activated by any of the well-known procedures such as, for example, by treatment with aqueous alkali solution.

The hydrogenation of unsaturated organic compounds may be carried out in a batch process or a continuous process. In a batch process for the hydrogenation of rosin, for example, the rosin may be placed in a closed vessel such as an autoclave, together with the catalyst in the form of small particles, and hydrogen admitted under pressure. The conditions of temperature and hydrogen pressure then may be adjusted and, after a lapse of sufficient time, the hydrogenated rosin drawn from the autoclave. In a continuous hydrogenation process, an unsaturated organic compound such as rosin may be passed continuously in a molten state over a hydrogenation catalyst in the form of particles or lumps, the reaction being carried out at superatmospheric pressure and elevated temperature.

The nickel-silicon-manganese alloy catalyst of this invention is useful for hydrogenating unsaturated compounds in both batch and continuous processes. Due to its great physical strength and stability under severe conditions, however, the catalyst of this invention is particularly useful in continuous hydrogenation processes.

The following examples represent specific embodiments of this invention and show the preparation of the catalyst and the utilization of the catalyst in specific hydrogenation processes. All parts are parts by weight.

EXAMPLE I

A nickel-silicon-manganese alloy was prepared by charging into an induction furnace 3,926.4 parts electrolytic nickel, 2,452.3 parts silicon of low calcium content and 200 parts of a silico-manganese alloy containing 65% manganese, 20% silicon, and 1% carbon, and supplying heat until the metals were in the molten state. The mixture was thoroughly stirred, cooled to 2100° F. and then poured into a cast iron tapered cylinder, open at the larger end. The ingot was removed from the mold as soon as solidified and while still at a red heat. The calculated composition of this alloy was 60.0% nickel, 37.6% silicon, and 2% manganese. The alloy was crushed to pass a screen having 3/8" square clear openings and the particles of alloy which were utilized in the subsequent hydrogenation process were retained on a screen having 5/32" square clear openings. The yield of usable alloy was 50%, based upon the weight of the ingot.

The nickel-silicon-manganese particles were activated by submersion for 45 minutes in a boiling aqueous solution containing 25% sodium hydroxide. The catalyst was then washed with water until the wash water was neutral, and dried by decanting the water and refluxing with methylcyclohexane. Residual water was condensed and drawn off, and the methylcyclohexane was decanted from the catalyst.

EXAMPLE II

Two hundred sixty-three parts of activated catalyst prepared as in Example I was weighed into a stainless steel wire screen basket fastened securely in a rocking-type autoclave. Four hundred parts of N wood rosin was charged into the autoclave which was then closed and swept thoroughly with hydrogen, the hydrogen pressure finally being built up to 5000 p. s. i. Heat was applied and rocking-type agitation begun. The hydrogenation was continued for 20 hours at 5000 p. s. i. and 525° F. during which time samples of rosin were taken periodically and analyzed by refractive index determinations. After 20 hours of hydrogenation the catalyst was examined and found to be in good condition. The particles were all hard and none had disintegrated. Table 1 shows the drop in refractive index of the rosin during the hydrogenation.

Table 1

| Reaction time (hours): | Refractive index at 100° C. |
|---|---|
| 0 | 1.5180 |
| 2 | 1.4933 |
| 6 | 1.4910 |
| 10 | 1.4895 |
| 14 | 1.4887 |
| 18 | 1.4887 |
| 20 | 1.4874 |

EXAMPLE III

N wood rosin was hydrogenated in a continuous process with a nickel-silicon-manganese catalyst. The equipment consisted of two stainless steel lined tubes equipped with input and output ports, temperature indicators, pressure gages, a vent for releasing hydrogen and a hydrogen input line. A catalyst prepared, activated, water-washed and dried as in Example I was charged to the second reactor tube in the amount of 13,608 parts and the reactor swept with hydrogen from top to bottom. The temperature was raised to 450° F. and maintained for 5 hours. The first reactor tube contained 13,600 parts of nickel-silicon-manganese alloy catalyst having a composition of 58.2% nickel, 37.0% silicon, and 4.0% manganese, which was prepared as in Example I, but which was partially spent as a result of previous use. The second reactor tube was cooled to 300° F. and the two reaction tubes placed in series. Hydrogen pressure was built up and maintained at 5000 p. s. i. in both reactor tubes, the hydrogen being maintained fresh by slow venting. Molten N wood rosin was introduced into the first reactor tube at the rate of 3,175.2 parts per hour and the temperature was adjusted to 400–425° F. in the first reactor and 410–435° F. in the second reactor tube. The unit was operated under these conditions for 4 days. The catalyst was found to have an activity equal to a straight nickel-silicon alloy catalyst. An analysis of the hydrogenated rosin produced during this time is shown in Table 2.

Table 2

| | |
|---|---|
| Melting point | 73.5–76.0° C. |
| Refractive index at 100° C | 1.4950–1.4963. |
| Color | X. |
| Acid number | 160–164. |
| Per cent saturation | 75–85%. |

After 4 days the feed rate of N wood rosin was increased to 15,422.4 parts per hour. The temperature of the first reactor tube was increased to 480–490° F. and on the second tube to 500° F. Pressure was maintained at 5000 p. s. i. After operating the unit under these conditions for 3 additional days the run was discontinued and the catalyst examined. Despite 7 days of continued operation, the catalyst particles were hard and in good condition and none of the particles had disintegrated. An analysis of the hydrogenated rosin produced is shown in Table 3. It will be noted that the higher reaction temperature and shorter period of contact between rosin and catalyst during the last 3 days of the run resulted in a hydrogenated rosin less saturated and having a lower acid number than the product produced during the first four days of the run.

Table 3

| | |
|---|---|
| Melting point | 74.0–76.0° C. |
| Refractive index at 100° C | 1.5000–1.5012. |
| Color | X. |
| Acid number | 156–163. |
| Per cent saturation | 48–54%. |

EXAMPLE IV

Following the general procedure of Example I, a nickel-silicon-manganese alloy catalyst having a composition of 57.3% nickel, 41.5% silicon and 1.0% manganese was prepared and activated for 30 minutes with a 25% aqueous solution of sodium hydroxide. N wood rosin then was hydrogenated in the presence of this catalyst in the manner described in Example II. After 20 hours of reaction time, the catalyst particles were hard and in good condition and no particles had disintegrated. Analysis of the hydrogenated rosin produced showed that this catalyst had an activity equal to a straight nickel-silicon alloy catalyst. An analysis of samples taken during the hydrogenation is shown in Table 4.

Table 4

| Reaction time (hours): | Refractive index at 100° C. |
|---|---|
| 0 | 1.5172 |
| 2 | 1.4926 |
| 10 | 1.4901 |
| 20 | 1.4882 |

EXAMPLE V

Following the general procedure of Example I, a nickel-silicon-manganese alloy catalyst having a composition of 45.1% nickel, 50.0% silicon, and 4.0% manganese was prepared and activated for 30 minutes with a 25% aqueous solution of sodium hydroxide. The activated catalyst was then used in a process for hydrogenating N wood rosin in the manner described in Example II. After 20 hours of reaction time the catalyst particles were hard and in good condition and no particles had disintegrated. An analysis of the hydrogenated rosin produced showed that this catalyst had an activity equal to a straight nickel-silicon alloy catalyst. An analysis of samples taken during the hydrogenation is shown in Table 5.

Table 5

| Reaction time (hours): | Refractive index at 100° C. |
|---|---|
| 0 | 1.5172 |
| 2 | 1.4952 |
| 10 | 1.4925 |
| 20 | 1.4920 |

EXAMPLE VI

Following the general procedure of Example I, a nickel-silicon-manganese alloy catalyst having a composition of 58.1% nickel, 37.0% silicon, and 4.0% manganese was prepared and activated for 30 minutes with a 25% aqueous solution of sodium hydroxide. The activated catalyst was then used in a process for hydrogenating N wood rosin in the manner described in Example II. After 20 hours of reaction time the catalyst particles were hard and in good condition and no particles had disintegrated. An analysis of the hydrogenated rosin produced showed that this catalyst had an activity equal to a straight nickel-silicon alloy catalyst. An analysis of samples taken during the process is shown in Table 6.

Table 6

| Reaction time (hours): | Refractive index at 100° C. |
|---|---|
| 0 | 1.5180 |
| 2 | 1.4959 |
| 10 | 1.4915 |
| 20 | 1.4905 |

The examples have illustrated the hydrogenation of rosin but it will be appreciated that the catalyst of this invention is readily adaptable to hydrogenation of other unsaturated compounds. The rosins which may be hydrogenated according to this invention may be those obtained by extraction from the stumps of the Jeffrey and Ponderosa pines as well as rosins better known to the art such as, for example, the rosins obtained from the Southern long-leaf pine tree. The rosins may be of either the crude or refined types having color grades ranging from FF to WW and may be of either the wood or gum variety. Besides ordinary rosin, dehydrogenated or disproportionated rosins, polymerized rosins, and partially hydrogenated rosins may also be hydrogenated by the process of this invention. These rosins contain, in addition to rosin acids, a nonacidic or neutral portion which may be present in amounts varying between 8.7% and about 24.4% by weight. They have acid numbers varying between 140 and 170.

The refined types of rosin which may be treated in accordance with the invention are those which have been distilled under reduced pressure; distilled under reduced pressure with the injection of an inert gas; extracted with color body solvents; treated with various adsorbents for the removal of various impurities, as color bodies, visible and latent, oxidized resin acids, etc. Furthermore, the rosin may be subjected to a preliminary heat-treatment before it is subjected to hydrogenation. Desirably, the heat-treatment will be carried out in an inert atmosphere, as, for example, carbon dioxide, nitrogen, etc. If desired, refining treatments may follow the treatment with hydrogen.

In addition to wood and gum rosin, the rosin compounds which may be hydrogenated in accordance with this invention include also the acids attainable from these rosins such as, for example, abietic, dehydroabietic, dihydroabietic, neoabietic, levopimaric, dextropimaric, isodextropimaric, etc.; esters of these rosin acids with a monohydric or polyhydric alcohol such as methyl abietate, ethyl abietate, glycerol abietate, pentaerythritol abietate, etc.; the alcohols produced by the reduction of the carboxyl group of a rosin acid such as abietyl alcohol, pimaryl alcohol, etc., and esters of these alcohols. By means of the process of this invention rosin nitrile may be hydrogenated to produce rosin amine and in general it may be said that the catalysts of the invention may be successfully utilized in any of the reactions catalyzed by Raney-type nickel-aluminum catalysts. Also, rosin acids containing materials such as tall oil and rosins separated from tall oil, such as sulfate wood rosin, may be hydrogenated according to this invention. However, it is desirable to remove catalyst poisoning constituents from such material prior to the hydrogenation.

The composition of the catalyst of this invention may vary widely within critical limits. Effective catalysts have been found to have a nickel content within the range of about 45% to about 73%, a silicon content in the range of about 25% to about 50% and a manganese content in the range of about 0.5% to about 10% of the weight of the total composition. However, as the nickel content is increased the catalyst activity falls off and as the silicon content is increased the alloy strength is decreased. For optimum activity and strength, it is preferred that the nickel-silicon-manganese catalysts of this invention have a nickel content within the range of about 55% to about 65%, a silicon content within the range of about 34% to about 43%, and a manganese content in the range of about 1% to about 4%. Since manganese is not a catalyst promoter, increasing the proportion of manganese in the catalyst serves only to dilute the active components of the catalyst and thus reduce catalyst activity. Consequently, it is desirable to keep the manganese content of the catalyst to the minimum amount necessary to give the alloy the strength necessary to allow the catalyst particles to retain their form and hardness throughout the hydrogenation process.

The most desirable size of the particles of the catalyst of this invention is controlled by two opposing sets of factors. High yield of catalyst, low loss in activation and the tendency of the stream of material being treated to pick up small particles of the alloy suggest the use of large particles. On the other hand, high efficiency of hydrogenation both as to degree of saturation and as to rate of production is more easily obtained by means of the large contact surface area provided by fine particles.

For the hydrogenation of unsaturated organic compounds in accordance with this invention, the catalyst preferably is used in the form of particles or fragments graded to a size which will pass through the holes of a screen having ½" square clear openings and be retained on a screen having 1/16" square clear openings, and more preferably of a size that will pass through the holes in a screen having ⅜" square clear openings and be retained on a screen having 5/32" square clear openings.

The catalyst alloy may be obtained conveniently in particles or fragments of the desired size by casting the alloy in masses of a larger size and then crushing as, for example, by means of a "jaw crusher." After being graded, the particles which are too large may be further reduced in size or remelted and the particles which are too small may be remelted and thus made suitable for further use.

Before being utilized in a hydrogenation process, the catalyst of this invention is desirably activated by one of the methods well-known to the art. It is particularly preferred to activate the catalyst by treatment with a hot alkali such as aqueous sodium hydroxide for from about 15 minutes to 1 hour. Since the catalyst after activation is intensely active, it is desirable to transfer it to the hydrogenation equipment covered with a film of water or other protective coating. Alternatively, the inactivated alloy may be charged into the hydrogenation equipment and activated therein. If an alkali solution is used, the activated catalyst may be washed free of alkali and other foreign substances with water and then dried with a current of warm, inert gas or by displacement by suitable solvents such as methylcyclohexane, etc.

In carrying out the process in accordance with this invention, the pellets of activated nickel-silicon-manganese alloy catalyst may be contained in a single reaction vessel through which the unsaturated material flows in liquid phase at suitable pressure and temperature while in contact with hydrogen. The unsaturated material may be passed through the catalyst bed at a rate which varies directly with the activity of the catalyst until the rate of flow becomes too slow to be practical, and then the spent catalyst replaced with fresh catalyst. In this way a uniformly hydrogenated product is obtained over a considerable period.

Alternatively, the pellets of activated nickel-silicon-manganese alloy catalyst may be placed in a plurality of reaction vessels or reactors and unsaturated material allowed to flow successively through each of them at suitable pressure and temperature while in contact with hydrogen. In following this alternative procedure, the unsaturated compound is passed through the plurality of reactors at a rate which may be varied directly with the activity of the catalyst until the activity of the catalyst becomes so low that the rate of flow is too slow to be practical, and then the spent catalyst in the first reactor is replaced with fresh catalyst and the order of the reactors is rearranged so that this first reactor becomes the last or final reactor and the reactor which was second now becomes the first. The process is then continued until the rate again becomes slow and again the catalyst in the reactor which is now first (originally second) is replaced, the reactor placed at the end of the process, and the second reactor (originally third) made the first. This is then repeated periodically as long as the process is continued, and after each recharging the rate of flow may be stepped up to approximately its original value.

In this way, a cyclic process is created in which the untreated compound is first hydrogenated in the presence of the least active catalyst and then successively treated in the presence of lots of catalysts of greater and greater activity. Furthermore, a process is obtained wherein any catalyst poisons which may be, and frequently are, present in the material being hydrogenated are trapped by the catalyst which is most nearly spent and, hence, least valuable. Thus, there is a maximum efficiency of hydrogenation for the amount of catalyst used and a uniformly hydrogenated product over long periods of time.

The hydrogen may, if desired, be admixed with the material being hydrogenated as it enters the first reactor and flows concurrently with the material through the entire series of reactors. This is a convenient method of operation. Alternatively, the hydrogen may be introduced into each of the reactors separately and flow either concurrently or countercurrently to the direction of flow of the material being hydrogenated. Again the hydrogen may be introduced into the final reactor and flow countercurrently throughout the series of reactors.

The hydrogenation equipment may be of any form generally used for continuous liquid phase hydrogenation and adapted to withstand the necessary pressures, but preferably, it will consist of either a single tube of considerable length in comparison to its diameter or of a plurality of such tubes arranged either in series, in parallel, or in series-parallel.

Considering only a single tube of the hydrogenation equipment the flow of hydrogen and of the molten rosin or other rosin compound through the tube may be conducted as follows: The hydrogen and the rosin or other rosin compound to be hydrogenated may be fed in at the bottom of the tube and caused to flow upward through the catalyst with the hydrogenated product being drawn off at the top of the tube. The hydrogen and the rosin or other compound to be hydrogenated may be admitted at the top of the tube and allowed to flow down through the catalyst, the rosin flowing over and around the lumps of catalyst and the hydrogenated product being withdrawn at the bottom. The hydrogen may be admitted at the bottom and the rosin or other compound at the top of the tube, the two flowing countercurrently over the catalyst.

Where a plurality of tubes are arranged in series, in parallel, or in series parallel, one of the above-described procedures may be followed exclusively, or the direction of flow will be varied in various of the tubes in one battery, the flow being parallel in some tubes and countercurrent in others. It will also be found advantageous to vary the temperature and hydrogen pressure in various of the tubes, although identical temperatures and pressures may be maintained in all the tubes if desired.

The temperature and pressure maintained during hydrogenation will depend upon the material being subjected to hydrogenation and the nature of the products desired. For the hydrogenation of compounds which are difficult to hydrogenate such as, for example, rosin, it is essential to proceed within rather definite ranges of conditions to obtain a sufficiently high degree of saturation to be of value.

Thus, under a given set of conditions, while the first double bond in rosin and other rosin compounds can be hydrogenated at temperatures of about 100° C. and hydrogen pressures of about 100 lbs. or less per square inch, satisfactory hydrogenation of the second double bond requires temperatures of the order of 210° C. to 230° C. and hydrogen pressures of 4000 to 5000 p. s. i. Under other conditions, however, as for example when rosin or rosin compounds are dissolved in a solvent, such as naphtha, isopropyl ether, etc., temperatures as low as 70° C. and hydrogen pressures as low at 100 p. s. i. may be used with satisfactory results.

For the hydrogenation of rosin in the molten condition, it is desirable to use a temperature within the range of about 125° C. to about 300° C. and a hydrogen pressure in excess of 300 p. s. i., and preferably a temperature within the range of about 160° C. to 240° C. and a pressure within the range of 4500 to 5500 p. s. i. Pressures in excess of 5000 p. s. i. are desirable from the standpoint of the degree of saturation secured, but ordinarily the advantage gained does not balance the increased difficulties of operation, cost of compression, etc.

When the catalyst has become inactive due to long continued use, it may be reactivated by treatment with an alkali solution, as, for example, a caustic soda solution. Prior to this reactivation treatment, it may be found desirable to extract the spent catalyst with a solvent for the rosin or other compound being hydrogenated. In some cases it will be found advantageous to give the spent catalyst an acid pickle prior to the reactivation treatment.

With the nickel-silicon-manganese alloy catalysts of this invention, 75% to 85% of the double bonds of resin acids present in rosin can be saturated in a continuous hydrogenation process using a reaction tube packed with catalyst of particle size as above described with a contact time of rosin and catalyst within the range of about 2–3 hours. To obtain a saturation of 45% to 55% of the double bonds of these resin acids under like conditions a contact time of from about 0.5–0.6 hour is sufficient. Under other operating conditions comparable rates of hydrogenation may be obtained. In addition to this high activity which is comparable to that of a straight nickel-silicon alloy catalyst the nickel-silicon-manganese alloy catalysts of this invention have the further advantage of increased strength not found in straight nickel-silicon alloy catalysts. It is this increased strength which permits the use of the catalyst of this invention in continuous hydrogenation operations for extended periods of time without softening or disintegration. With the catalyst of this invention, the hydrogenated product withdrawn from the equipment is clear and free of any suspended catalyst and in a condition such that no filtration whatsoever is required.

This application is a division of application Serial No. 214,436, filed March 7, 1951, and entitled "Hydrogenation Process and Catalyst Therefor."

What we claim and desire to protect by Letters Patent is:

1. The process for hydrogenating an unsaturated organic compound selected from the group consisting of rosin, disproportionated rosin, polymerized rosin, partially hydrogenated rosin, unsaturated rosin acids, lower alkyl and lower hydroxyalkyl esters of unsaturated rosin acids, alcohols produced by the reduction of the carboxyl group of an unsaturated rosin acid, rosin nitriles and tall oil which comprises subjecting said compound in the molten state to reaction with hydrogen at a temperature less than about 300° C. and at a pressure of at least 300 p. s. i. in the presence of a catalyst prepared by activating a nickel-silicon-manganese alloy containing from about 45% to about 73% nickel, from about 25% to about 50% silicon and from about 0.5% to about 10% manganese by treatment with aqueous alkali.

2. The process of hydrogenating an unsaturated organic compound selected from the group consisting of rosin, disproportionated rosin, polymerized rosin, partially hydrogenated rosin, unsaturated rosin acids, lower alkyl and lower hydroxyalkyl esters of unsaturated rosin acids, alcohols produced by the reduction of the carboxyl group of an unsaturated rosin acid, rosin nitriles and tall oil which comprises subjecting said compound in the molten state to reaction with hydrogen at a temperature from about 160° to about 240° C. and a pressure of from about 4500 p. s. i. to about 5500 p. s. i. in the presence of a catalyst prepared by activating a nickel-silicon-manganese alloy containing from about 55% to about 65% nickel, from about 34% to about 43% silicon, and from about 1% to about 4% manganese by treatment with aqueous sodium hydroxide.

3. The process of claim 1 in which the material subjected to hydrogenation is rosin.

4. The process of claim 1 in which the material subjected to hydrogenation is a methyl ester of an unsaturated rosin acid.

5. The process of claim 1 in which the nickel-silicon-manganese alloy catalyst contains from about 55% to about 65% nickel, from about 34% to about 43% silicon, and from about 1% to about 4% manganese.

6. The process of claim 5 in which the material subjected to hydrogenation is rosin.

7. The process of claim 5 in which the material subjected to hydrogenation is a methyl ester of an unsaturated rosin acid.

8. The process of claim 1 wherein the temperature is from about 160° C. to about 240° C. and the hydrogen pressure is from about 4500 p. s. i. to about 5500 p. s. i.

9. The process of claim 8 wherein the material subjected to hydrogenation is rosin.

10. The process of claim 8 wherein the material subjected to hydrogenation is a methyl ester of an unsaturated rosin acid.

11. The process of claim 2 wherein the material subjected to hydrogenation is a methyl ester of an unsaturated rosin acid.

12. The process of claim 2 wherein the material subjected to hydrogenation is rosin.

References Cited in the file of this patent

UNITED STATES PATENTS

| | | |
|---|---|---|
| Re. 21,448 | Byrkit | Oct. 3, 1939 |
| 2,674,634 | Greensfelder et al. | Apr. 6, 1954 |
| 2,675,390 | Rosenblatt | Apr. 13, 1954 |
| 2,683,721 | Schlesinger | July 13, 1954 |

OTHER REFERENCES

"Ind. and Eng. Chem." vol. 32, #9, pp. 1199–1203 (1940).

Alexander: Colloid Chem., vol. 6, p. 218.